US007845594B2

(12) United States Patent
Poggi

(10) Patent No.: US 7,845,594 B2
(45) Date of Patent: Dec. 7, 2010

(54) HELICOPTER COLLAPSIBLE DECK

(75) Inventor: Stefano Poggi, Olgiate Comasco (IT)

(73) Assignee: Agusta S.p.A., Samarate (IT)

( * ) Notice: Subject to any disclaimer, the term of this patent is extended or adjusted under 35 U.S.C. 154(b) by 96 days.

(21) Appl. No.: 11/584,463

(22) Filed: Oct. 20, 2006

(65) Prior Publication Data

US 2007/0114331 A1    May 24, 2007

(30) Foreign Application Priority Data

Oct. 21, 2005    (EP) .................................. 05425743

(51) Int. Cl.
*B64C 1/18* (2006.01)
(52) U.S. Cl. ................. 244/117 R; 244/17.11; 244/131
(58) Field of Classification Search .......... 244/17.11, 244/117 R, 118.1, 118.2, 119, 131, 137.1, 244/132, 120
See application file for complete search history.

(56) References Cited

U.S. PATENT DOCUMENTS

| 4,292,375 | A | * | 9/1981 | Ko .............................. 428/593 |
| 4,593,870 | A | * | 6/1986 | Cronkhite et al. ....... 244/117 R |
| 5,069,318 | A | | 12/1991 | Kulesha et al. |
| 5,544,844 | A | * | 8/1996 | Groen et al. ................... 244/8 |
| 5,843,558 | A | * | 12/1998 | Yoshizaki et al. ........... 244/119 |
| 6,427,945 | B1 | * | 8/2002 | Bansemir .................. 244/129.1 |
| 6,959,894 | B2 | * | 11/2005 | Hayashi ................... 244/17.11 |
| 2005/0211520 | A1 | * | 9/2005 | Abu-Odeh et al. .......... 188/377 |

OTHER PUBLICATIONS

Lanzi, Bisagni, Ricci, "Crashworthiness optimization of helicopter subfloor based on decomposition and global approximation", Jun. 29, 2004, Springer-Verlag, pp. 401-410, accessed online on Jun. 4, 2009 at http://www.springerlink.com/content/q6jl16vmgmnkpwte/fulltext.pdf.*
Cronkhite, J.D. and Berry, V.L., "Crashworthy Airframe Design Concepts Fabrication and Testing", NASA Contractor Resport 3603, 1982, pp. 3-9, 18-25, 33, 62-71 and cover.*
Kindervater, C.M "Crash resistant Composite Helicopter Structural Concepts—Thermoset and Thermoplastic Corrugated Web Designs". AHS National Technical Specialists Meeting on Advanced Rotorcraft Structures. Proceedings, Oct. 30, 1995, pp. 1-18.
Legstari, W. et al; "Development of a Trigger Mechanism to Reduce Peak Forces in Crash Loaded Composite Sine-Wave Spars", European Rotorcraft Forum, Oct. 4, 1994, p. 107-1.

* cited by examiner

*Primary Examiner*—Tien Dinh
*Assistant Examiner*—Richard R Green
(74) *Attorney, Agent, or Firm*—Mitchell P. Brook; Luce, Forward, Hamilton & Scripps LLP

(57) ABSTRACT

A helicopter collapsible deck having at least one longitudinal member and at least one cross member, which extend respectively in a first and second direction intersecting at a point; the cross member is interrupted at the point of intersection; the deck also has an anchoring device for connecting the longitudinal member and the cross member at the point of intersection; and the anchoring device has at least one local permanent deformation section lying in a plane crosswise to the deck and for dissipating the energy transmitted to the deck in the event of impact.

19 Claims, 5 Drawing Sheets

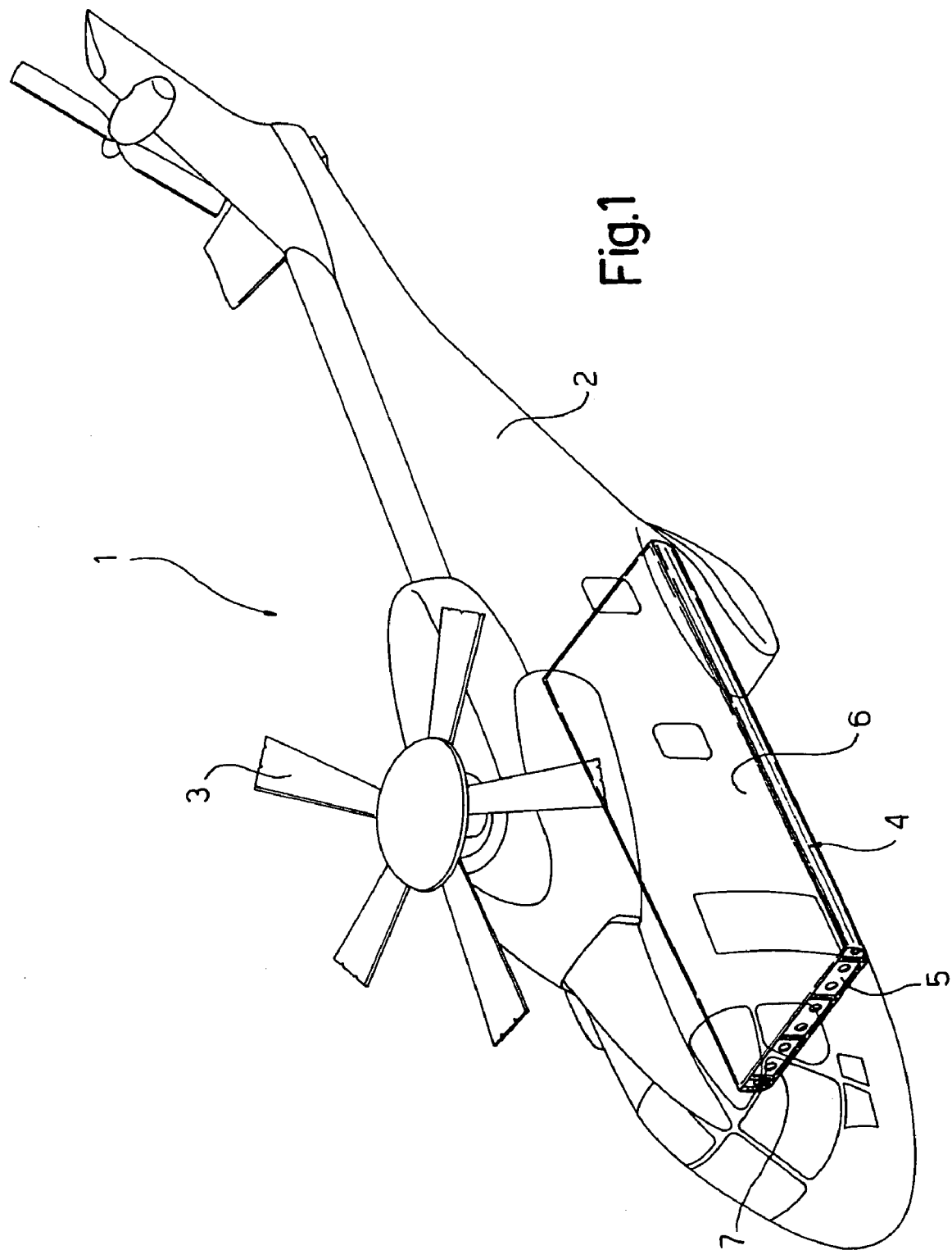

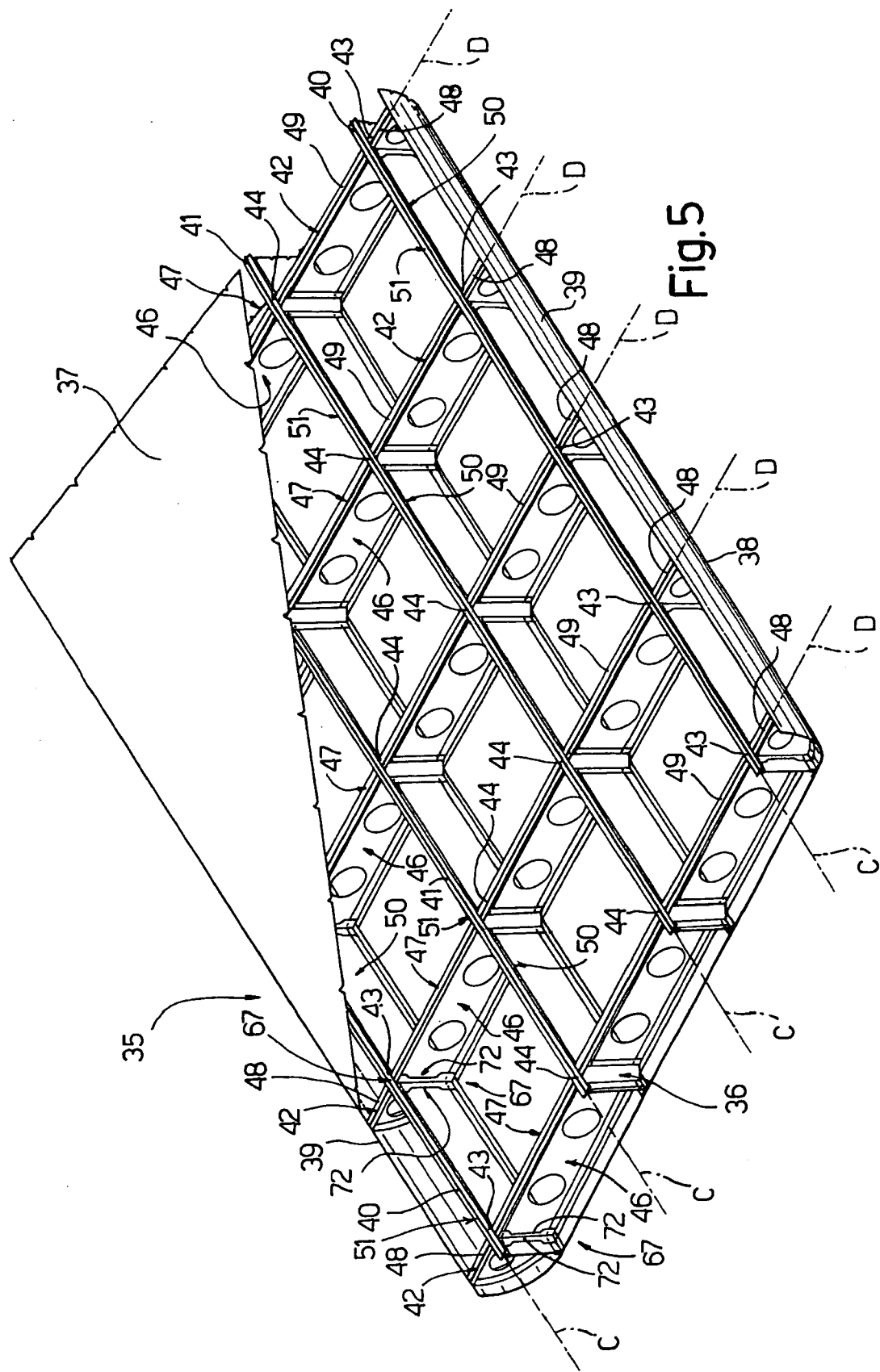

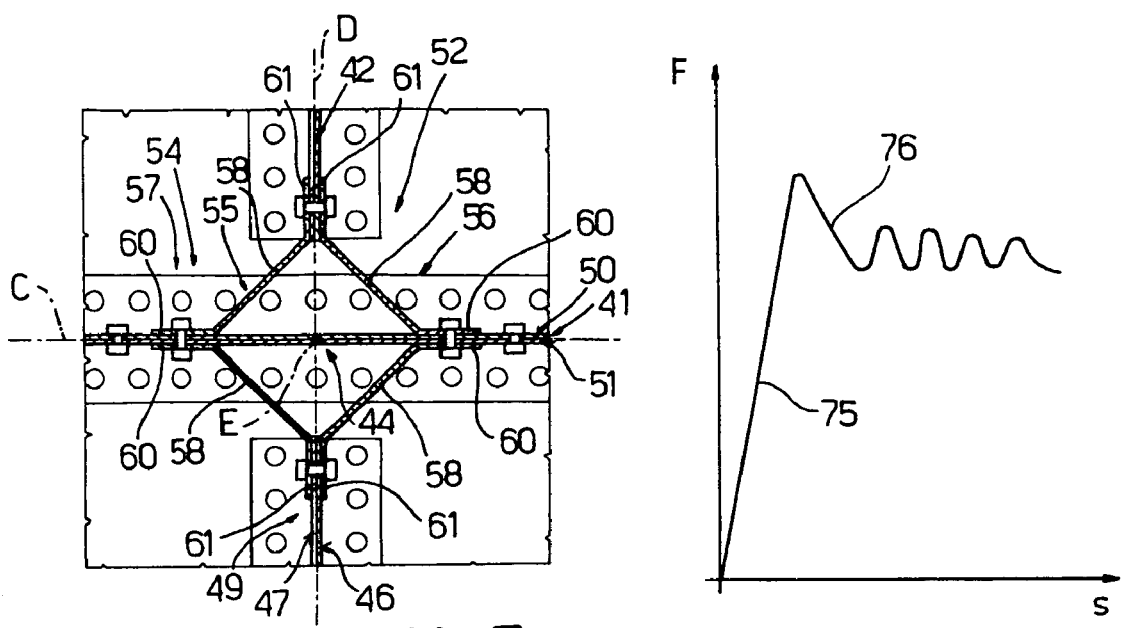
Fig. 7
Fig. 8
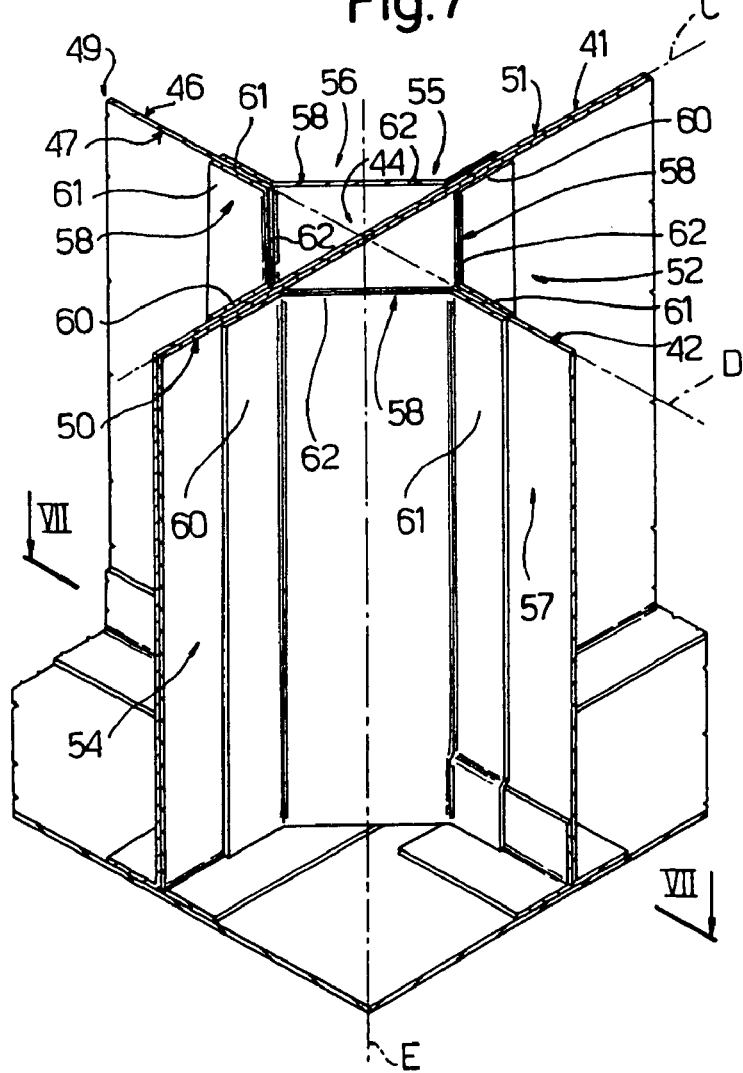
Fig. 6

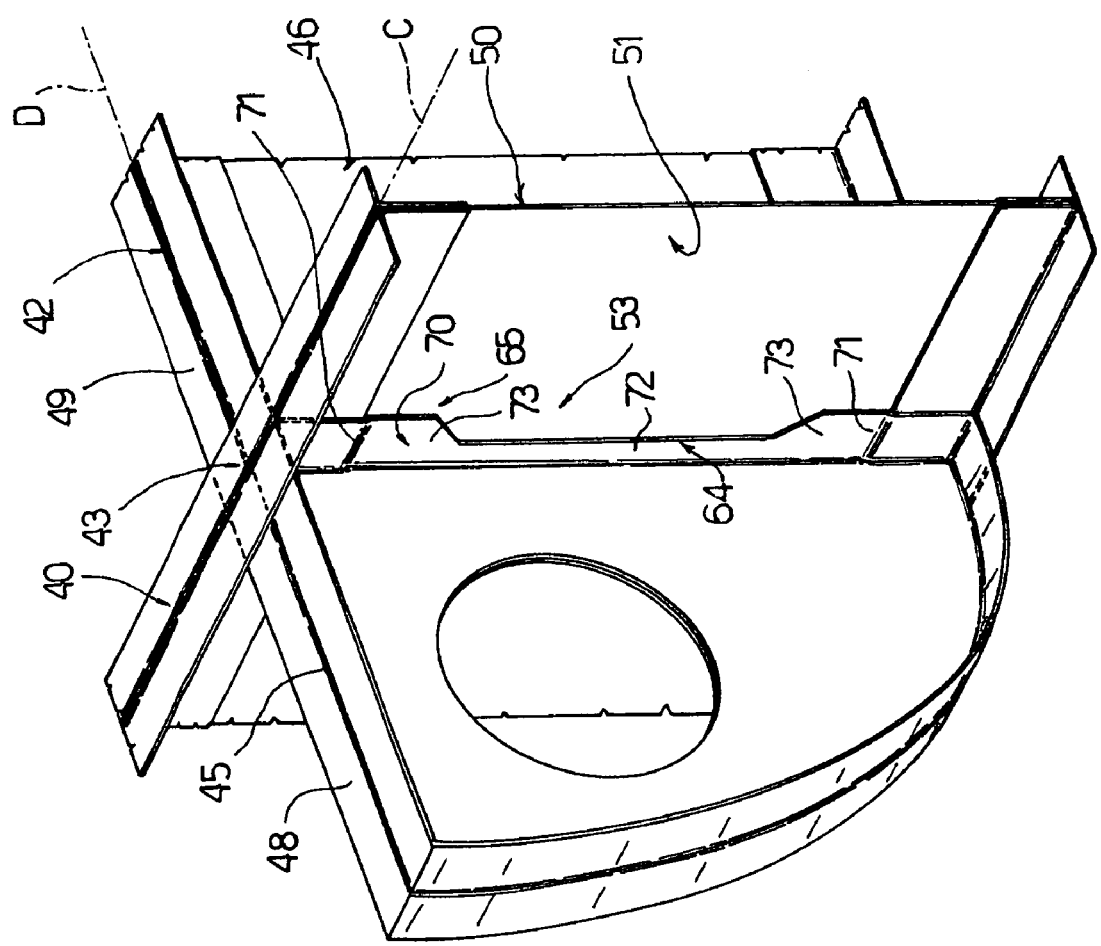

HELICOPTER COLLAPSIBLE DECK

The present invention relates to a helicopter collapsible deck.

BACKGROUND OF THE INVENTION

Number 1 in FIG. 1 indicates as a whole a helicopter substantially comprising a fuselage 2 housing the crew and on-board equipment; and a rotor 3 projecting from a top portion of fuselage 2 and for generating a force by which to sustain helicopter 1.

In more detail, on the opposite side to rotor 3, fuselage 2 is bounded by a deck 4 for supporting the crew and on-board equipment.

More specifically, deck 4 is of known type, comprises a frame 5 for imparting to deck 4 the necessary structural strength to support the crew and on-board equipment, and defines a crew tread surface 6 on one side of frame 5, and, on the opposite side, a portion 7 of the outer surface of fuselage 2.

Frame 5, shown partly in FIGS. 2 and 3, comprises a lattice defined by a number of longitudinal members 10 (only one shown) extending in respective parallel directions A, and by a number of cross members 11 (only one shown) extending in respective parallel directions B intersecting directions A perpendicularly at a number of nodes 12 (only one shown).

Cross members 11 are interrupted at each node 12 to avoid interfering with longitudinal members 10, and are fixed to longitudinal members 10, at each node 12, by an anchoring device 13 (only one shown in detail).

More specifically, longitudinal members 10 are defined by elongated flat walls, and are bounded, on opposite sides of direction A, by respective surfaces 21, 22. Similarly, cross members 11 are defined by elongated flat walls, interrupted at the various nodes 12, and are bounded, on opposite sides of direction B, by respective surfaces 17, 18.

More specifically, anchoring device 13 comprises two pairs 27, 28 of connecting members 14, which are located on opposite sides of direction B to connect respective surfaces 17 and 18 to surfaces 21 and 22.

More specifically, connecting members 14 in pair 27 are located on opposite sides of direction A; a first connecting member 14 connects surface 17 to surface 21; and a second connecting member 14 connects surface 17 to surface 22.

Similarly, connecting members 14 in pair 28 are located on opposite sides of direction A; a first connecting member 14 connects surface 18 to surface 21; and a second connecting member 14 connects surface 18 to surface 22.

More specifically, connecting members 14 are identical, and each comprise a portion 29 and a portion 30, which are of equal extension, are perpendicular to each other, are fixed to longitudinal member 10 and cross member 11 respectively, are parallel to directions A and B respectively, and are therefore joined at node 12.

FIG. 4 shows a graph of the force F exerted at a given node 12 versus the displacement s of a point on deck 4 corresponding to given node 12, in the event of impact in a direction perpendicular to deck 4.

The graph comprises a portion 31 increasing steadily to a maximum value corresponding to reversible elastic deformation of anchoring device 13; and a decreasing portion 32 following portion 31 and corresponding to permanent global deformation of anchoring device 13.

More specifically, along portion 31, the energy acquired by deck 4 during impact is transmitted back to tread surface 6, and from tread surface 6 to the crew and on-board equipment.

Along portion 32, on the other hand, as opposed to being transmitted to tread surface 6, the energy acquired by deck 4 during impact is dissipated in the form of permanent deformation of deck 4.

Deck 4 is therefore only able to dissipate energy in the form of permanent deformation after transmitting the maximum force to tread surface 6, which may correspond to an intolerable amount of energy transmitted to the crew and passengers.

A need is therefore felt in the industry to reduce the amount of energy transmitted by the deck to the tread surface, in the event of impact, to safeguard the crew and passengers.

Moreover, for certain missions, helicopter certification regulations require that the helicopter deck be capable of absorbing a given amount of impact energy, without transmitting it to the crew or passengers.

SUMMARY OF THE INVENTION

It is an object of the present invention to provide a helicopter collapsible deck designed to meet the above requirements in a straightforward, low-cost manner.

According to the present invention, there is provided a helicopter collapsible deck, as claimed in the attached claims.

BRIEF DESCRIPTION OF THE DRAWINGS

A preferred, non-limiting embodiment of the present invention will be described by way of example with reference to the accompanying drawings, in which:

FIG. 1 shows a view in perspective, with parts removed for clarity, of a helicopter comprising a known deck;

FIG. 5 shows a view in perspective of a deck in accordance with the teachings of the present invention;

FIG. 6 shows a larger-scale view in perspective of a detail of the FIG. 5 deck;

FIG. 7 shows a section along line VII-VII in FIG. 6;

FIG. 8 shows a graph of the force exerted on a given area of the FIG. 5 deck versus displacement of the area;

FIG. 9 shows a larger-scale view in perspective of a further detail of the FIG. 5 deck.

DETAILED DESCRIPTION OF THE INVENTION

Figure 3:
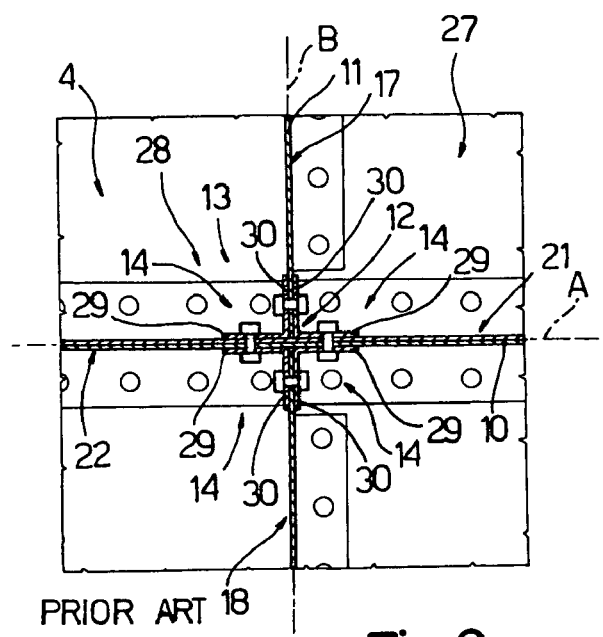
FIG. 3 shows a section along line III-III in FIG. 2.

FIG. 5 shows a collapsible deck 35 of helicopter 1, which, like deck 4, substantially comprises a frame 36 for imparting to deck 35 the necessary structural strength to support the crew and on-board equipment, and defines, on opposite sides of frame 36, a crew tread surface 37 and a portion 38 of the outer surface of fuselage 2 of helicopter 1.

At opposite lateral ends, deck 35 comprises two walls 39 laterally joining tread surface 37 and portion 38, and curving to blend with respective sidewalls of fuselage 2 of helicopter 1.

Frame 36 comprises a lattice defined by a number of longitudinal members 40, 41 extending in respective directions C parallel to one another and to walls 39, and by a number of cross members 42 extending between walls 39 and in respective directions D parallel to one another and perpendicular to directions C.

More specifically, longitudinal members 40 are located adjacent to walls 39, while longitudinal members 41 are interposed between longitudinal members 40. Directions C of longitudinal members 40 intersect directions D at a number of points or nodes 43 arranged in two lateral rows, and directions C of longitudinal members 41 intersect directions D at a number of further points or nodes 44 interposed between said rows.

Each longitudinal member 40, 41 comprises an elongated flat wall, and is bounded, on opposite sides of relative direction C, by respective lateral surfaces 50, 51.

Like longitudinal members 40, 41, each cross member 42 is defined by an elongated flat wall, which extends between walls 39 and has two opposite end portions 48 curving in a plane perpendicular to deck 35 and to longitudinal members 40, 41 so as to blend with walls 39; and each cross member 42 comprises a rectangular portion 49 interposed between portions 48 and elongated in said plane.

Cross members 42 are interrupted at each node 43, 44 to avoid interfering with longitudinal members 40, 41, and are each bounded, on opposite sides of relative direction D, by respective surfaces 46, 47.

As shown in more detail in FIGS. 6, 7 and 9, cross members 42 are fixed to longitudinal members 40, 41, at each node 43, 44, by respective anchoring devices 52, 53.

According to an important aspect of the present invention, each anchoring device 52, 53 comprises at least one local permanent deformation section 54, 64 (54 indicated as a whole in FIG. 6) crosswise to deck 35 and for dissipating the energy transmitted to deck 35 in the event of impact.

More specifically, as explained in detail below, each anchoring device 52, 53 has a weak point at section 54, 64, so that section 54, 64 is permanently deformed and so dissipates energy at impact force values incapable of permanently deforming anchoring device 52, 53 as a whole.

The maximum force value transmitted by each anchoring device 52, 53 to tread surface 37 without dissipating any energy is therefore extremely low, and lower than the maximum force value transmitted by known anchoring devices 13, which dissipate energy by permanently deforming globally.

More specifically, anchoring devices 52 fix cross members 42 to longitudinal members 41 at respective nodes 44, and anchoring devices 53 fix cross members 42 to longitudinal members 40 at respective nodes 43.

More specifically, most of the weight of the crew and on-board equipment weighs on nodes 44, and the rest on nodes 43.

With particular reference to FIGS. 6 and 7, each anchoring device 52 advantageously has a closed polygonal contour 55 surrounding relative node 44 at a predetermined distance.

More specifically, each anchoring device 52 is symmetrical with respect to its own axis E—which is perpendicular to deck 35, when the anchoring device is fixed—and is of constant section in planes perpendicular to axis E.

More specifically, contour 55 surrounds relative node 44 at a predetermined distance which is less than the axial extension of anchoring device 52 and greater than the thickness of contour 55 measured perpendicularly to contour 55.

As shown in FIGS. 6 and 7, anchoring device 52 is therefore a thin-section solid with a closed contour 55, which, in the event of impact perpendicular to deck 35, is subjected to compressive stress.

As is known, compressed thin-section solids give rise to undulated permanent deformation lines parallel to the direction of the compressive force, and which, due to local elastic instability, are generated at an imperfectly shaped section of the solid substantially crosswise to the compressive force.

More specifically, the above deformation is produced under applied forces lower than those necessary to permanently deform the solid due to global instability or static yield.

Each anchoring device 52 is therefore permanently deformed at the section indicated as a whole by 54, which has shape imperfections not shown, so that the energy acquired during impact is dissipated by each anchoring device 52 as of low transmitted force values withstandable by the crew and passengers.

More specifically, contour 55 of each anchoring device 52 is defined by two pairs 56, 57 of connecting members 58, which are located on opposite sides of relative direction D and connect surfaces 46 and 47 of relative cross member 42 respectively to surfaces 50 and 51 of relative longitudinal member 41.

More specifically, connecting members 58 in pair 56 are located on opposite sides of direction C; one of connecting members 58 connects surface 46 to surface 50; and the other connecting member 58 connects surface 46 to surface 51.

Similarly, connecting members 58 in pair 57 are located on opposite sides of direction C; one of connecting members 58 connects surface 47 to surface 50; and the other connecting member 58 connects surface 47 to surface 51.

More specifically, connecting members 58 are identical, and each comprise, at opposite ends, a flat portion 60 and a flat portion 61 extending in directions perpendicular to each other, and a flat portion 62 extending obliquely with respect to portions 60 and 61.

Portions 60 and 61 are fixed to relative longitudinal member 41 and relative cross member 42 respectively at a predetermined distance from relative node 44, so that portion 62 is also a predetermined distance from node 44.

Closed polygonal contour 55 of each anchoring device 52 is therefore defined by portions 62 of the four connecting members 58 surrounding relative node 44.

The arrangement of portions 60, 61 and 62 of each connecting member 58 facilitates permanent deformation of anchoring device 52 following deformation of section 54. That is, by virtue of contour 55 surrounding node 44 at a predetermined distance, the force of the impact generates highly intense bending moments on portions 60, 61, 62, which are therefore permanently deformed—literally "crushed"—in the direction of relative axis E.

The flat shape of oblique portion 62 of each connecting member 58 is particularly advantageous by maximizing the bending moments on portions 60, 61, 62 with no need, between portions 60 and 61, for noncontinuous curved or polygonal portions which are difficult to produce.

FIG. 8 shows a graph of the force F exerted at a given node 44 versus the displacement s of a point on deck 35 corresponding to given node 44, in the event of impact in a direction perpendicular to deck 35.

The graph comprises a portion 75 increasing steadily to a maximum force value corresponding to reversible elastic deformation of node 44; and a portion 76 following portion 75 and which first decreases and then oscillates about a mean value.

Along portion 75, the energy acquired by deck 35 during impact is transmitted back to tread surface 37, whereas, along portion 76, as opposed to being transmitted to tread surface 37, the energy acquired by deck 35 is dissipated in the form of permanent deformation of deck 35.

More specifically, the maximum force value is reached upon local deformation of section 54 due to local instability; and, after the maximum value, portion 76 oscillates and comprises a number of secondary maximum and minimum force values corresponding to gradual permanent deformation of respective portions of anchoring device 52 due to static yield.

Figure 4:
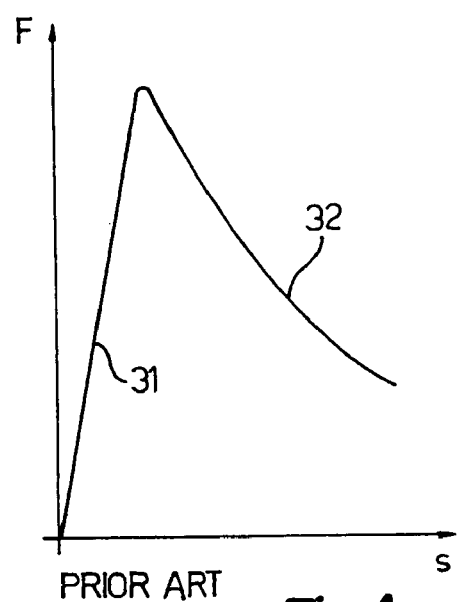
FIG. 4 shows a graph of the force exerted on a given area of the FIG. 1 deck versus displacement of the area.
Figure 2:
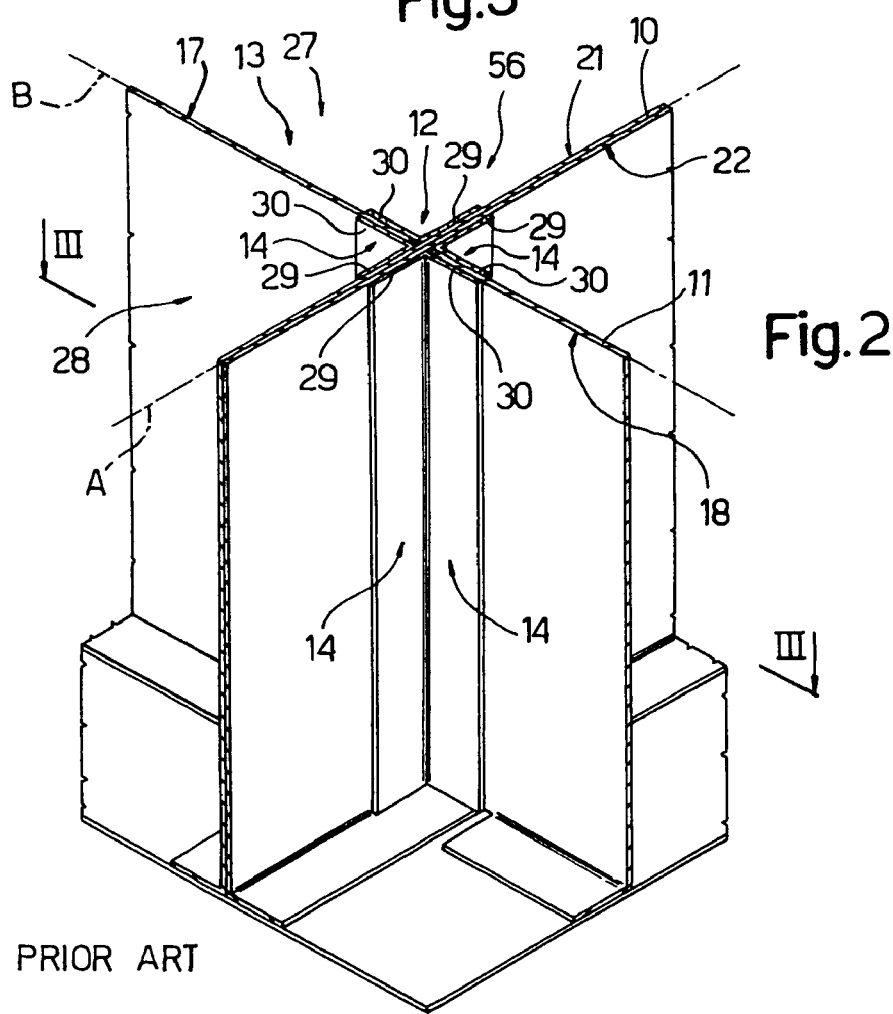
FIG. 2 shows a larger-scale view in perspective of a detail of FIG. 1.

As can be seen by comparing the FIGS. 4 and 8 graphs, anchoring device 52 according to the invention deforms permanently and transmits a lower force value than known anchoring device 13; and, in the event of impact, the total energy dissipated by deck 35—as shown by the X axis in the FIG. 8 graph—is greater than the energy dissipated by deck 4—as shown the X axis in the FIG. 4 graph—by virtue of portion 76 oscillating about a mean value.

The maximum force value transmitted by deck 35 to tread surface 37 is reduced, by anchoring device 52 according to the invention deforming locally, due to local instability, at lower force values than those required to permanently deform known anchoring device 13 as a whole.

The force transmitted by deck 35 to tread surface 37 without dissipating any energy is therefore lower than that transmitted by deck 4 to tread surface 6, and therefore better tolerated by the crew and passengers.

FIGS. 5 and 9 show partly an anchoring device 53, which is advantageously of minimum size at local permanent deformation section 64, which extends parallel to deck 35 when fixed.

As is known, section 64 constitutes a weak point which, in the event of compression perpendicular to deck 35, results in local permanent deformation at applied force values lower than those necessary to permanently deform anchoring device 53 as a whole.

Like anchoring device 52, anchoring device 53 therefore deforms permanently at section 64, and begins dissipating impact-acquired energy at extremely low impact-transmitted force values withstandable by crew and on-board equipment.

More specifically, each anchoring device 53 comprises a connecting member 65 for connecting one end 45, opposite wall 39, of portion 48 of relative cross member 42 to relative longitudinal member 40; and two connecting members 67 (only one shown in FIG. 5) for connecting portion 49 of cross member 42 to longitudinal member 40.

More specifically, connecting member 65 comprises two hourglass-shaped plates 70 (only one shown in FIG. 9) located on opposite sides of relative direction D and projecting perpendicularly from end 45, so that each hourglass-shaped plate 70 is parallel to direction C when fixed to longitudinal member 40.

More specifically, when fixed, each hourglass-shaped plate 70 lies in a plane coincident with a plane perpendicular to direction D, and comprises two rectangular end portions 71 which are fixed to relative longitudinal member 40; a portion 72 smaller than portions 71 and defining permanent deformation section 64; and two trapezoidal portions 73 connecting portions 71 to opposite ends of portion 72.

Connecting members 67 (FIG. 5) are located on opposite sides of relative direction D. More specifically, a first connecting member 67 in the pair (not shown) connects surface 47 of relative cross member 42 to surface 50 of relative longitudinal member 40, while the other connecting member 67 connects surface 46 of cross member 42 to surface 50 of longitudinal member 40.

More specifically, connecting members 67 are identical, and each comprise two hourglass-shaped plates 70 as described above and fixed respectively to relative cross member 42 and relative longitudinal member 40.

The advantages of helicopter collapsible deck 35 according to the present invention will be clear from the foregoing description.

In particular, by virtue of local permanent deformation of sections 54, 64 of anchoring devices 52, 53, in the event of impact, deck 35 has proved highly effective in dissipating most of the impact energy, without transmitting force values intolerable to the crew and passengers, thus also conforming with certification regulations governing missions of given duration.

Clearly, changes may be made to helicopter collapsible deck 35 as described and illustrated herein without, however, departing from the scope as defined in the accompanying claims.

The invention claimed is:

1. A deformable deck for a helicopter comprising:
   at least one longitudinal member and at least one cross member, which extend respectively in a first and second direction intersecting at a point, said cross member being interrupted at said point of intersection; and
   an anchoring device for connecting said longitudinal member and said cross member at said point of intersection;
   said anchoring device in a plane parallel to said first and second directions at a section, so as to permanently dissipate the energy absorbed by said deformable deck, in the event of impact, by deformation of said section;
   said longitudinal member and said cross member comprising respective first edges and second edges, said second edges directly supporting a tread surface;
   said longitudinal member and said cross member contacting each other at a common third edge extending between said first edges and between said second edges;
   characterized in that said anchoring device comprises:
   at least one half hourglass-shaped plate extending between and in contact with said first edge and said second edge of a relative one between said longitudinal member and said cross member;
   said deck being further characterized in that said half hourglass-shaped plate lies in a plane parallel to the direction of said relative one between said longitudinal member and cross member and is bounded by a first rectilinear continuous segment which is superimposed on said third edge and by a second segment, opposite to said first segment;
   said plate further comprising:
   two end first portions fixed respectively to said first and second edge of said relative one between said longitudinal member or said cross member;
   a second portion smaller than said first portions in said direction of said relative one between said longitudinal member, arranged between said first portions and defining said section; and
   an undercut which is bounded on a first side by said second portion, and is, on a second side opposite to said first side, open, said undercut being open on the opposite side of said second segment with respect to said first segment, and being bounded by said second segment.

2. The deck according to claim 1 further comprising two trapezoidal third portions connecting said second portion to respective said first portions.

3. The deck according to claim 2, characterized in that said hour-glass shaped plate lies in a plane coincident with a plane perpendicular to said second direction.

4. The deck according to claim 3, characterized by comprising, at opposite lateral ends, two walls curved to blend with respective sidewalls of a fuselage of said helicopter, wherein said at least one longitudinal member comprises one or more first longitudinal members and a pair of second longitudinal members located adjacent to respective walls;
   one or more first longitudinal members being interposed between said second longitudinal members.

5. A helicopter comprising a fuselage with sidewalls and a deformable deck according to claim 4.

6. A helicopter comprising a fuselage with sidewalls and a deformable deck according to claim 3.

7. The deck according to claim 2, characterized by comprising, at opposite lateral ends, two walls curved to blend with respective sidewalls of a fuselage of said helicopter, wherein said at least one longitudinal member comprises one or more first longitudinal members and a pair of second longitudinal members located adjacent to respective walls;
- one or more first longitudinal members being interposed between said second longitudinal members.

8. A helicopter comprising a fuselage with sidewalls and a deformable deck according to claim 7.

9. A helicopter comprising a fuselage with sidewalls and a deformable deck according to claim 2.

10. The deck according to claim 1, characterized in that said hour-glass shaped plate lies in a plane coincident with a plane perpendicular to said second direction.

11. The deck according to claim 10, characterized by comprising, at opposite lateral ends, two walls curved to blend with respective sidewalls of a fuselage of said helicopter, wherein said at least one longitudinal member comprises one or more first longitudinal members and a pair of second longitudinal members located adjacent to respective walls;
- one or more first longitudinal members being interposed between said second longitudinal members.

12. A helicopter comprising a fuselage with sidewalls and a deformable deck according to claim 11.

13. A helicopter comprising a fuselage with sidewalls and a deformable deck according to claim 10.

14. The deck according to claim 1, characterized by comprising, at opposite lateral ends, two walls curved to blend with respective sidewalls of a fuselage of said helicopter, wherein said at least one longitudinal member comprises one or more first longitudinal members and a pair of second longitudinal members located adjacent to respective walls;
- one or more first longitudinal members being interposed between said second longitudinal members.

15. A helicopter comprising a fuselage with sidewalls and a deformable deck according to claim 14.

16. A helicopter comprising a fuselage with sidewalls and a deformable deck according to claim 1.

17. A helicopter comprising a fuselage with sidewalls and a deformable deck according to claim 1.

18. A helicopter comprising a fuselage with sidewalls and a deformable deck according to claim 1.

19. A deck according to claim 1, wherein the at least one half hourglass-shaped plate comprises a first and a second half hourglass-shaped plate;
- said first half hourglass-shaped plate extending between and being in contact with said first edge and said second edge of said longitudinal member;
- said second half hourglass-shaped plate extending between and being in contact with said first edge and second edge of said cross member;
- said second portions of said first and second half hourglass-shaped plates being connected to one another.

* * * * *